(12) United States Patent
Miller et al.

(10) Patent No.: US 11,521,186 B2
(45) Date of Patent: Dec. 6, 2022

(54) RECIPIENT MANAGEMENT IN COMPUTER NETWORK INITIATED DATA TRANSFERS

(71) Applicant: THE TORONTO-DOMINION BANK, Toronto (CA)

(72) Inventors: Robert Kyle Miller, Mississauga (CA); Sonja Torbica, Toronto (CA); Helene Nicole Esposito, Mississauga (CA); Harrison Michael James Reilly, Toronto (CA); Matta Wakim, Petersburg (CA); Kyryll Odobetskiy, Waterloo (CA); Dexter Lamont Fichuk, Kitchener (CA); Adam Douglas McPhee, Waterloo (CA); Omas Abdullah, Waterloo (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/106,124

(22) Filed: Aug. 21, 2018

(65) Prior Publication Data
US 2020/0065782 A1 Feb. 27, 2020

(51) Int. Cl.
| | |
|---|---|
| G06Q 20/40 | (2012.01) |
| G06Q 20/32 | (2012.01) |
| G06Q 20/38 | (2012.01) |
| H04L 29/06 | (2006.01) |
| G06Q 20/10 | (2012.01) |
| G06F 16/23 | (2019.01) |

(52) U.S. Cl.
CPC ......... *G06Q 20/10* (2013.01); *G06F 16/2379* (2019.01)

(58) Field of Classification Search
CPC ...... G06Q 20/10; G06Q 20/102; G06Q 20/14; G06Q 30/04; G06F 16/2379; G06F 16/2372; G06F 16/2386; G06F 16/23; G06F 16/27; G06F 16/273; G06F 16/275
See application file for complete search history.

(56) References Cited

U.S. PATENT DOCUMENTS

| | | |
|---|---|---|
| 5,093,787 A | 3/1992 | Simmons |
| 6,408,284 B1 | 6/2002 | Hilt et al. |
| 6,996,542 B1 * | 2/2006 | Landry ................. G06Q 20/04 705/40 |
| 7,296,004 B1 | 11/2007 | Garrison et al. |

(Continued)

*Primary Examiner* — Calvin L Hewitt, II
*Assistant Examiner* — Douglas W Pinsky
(74) *Attorney, Agent, or Firm* — Rowand LLP

(57) ABSTRACT

A computerized data transfer system allows data transfers to be initiated over a network between senders and recipients. Individual senders initiate data transfers over the network by selecting a recipient from a list at a sender device. The system includes a data store of sender specific recipients, a data transfer history data store of past transfers; and a master participant data store storing profiles of recipients for which transfers can be initiated. The system includes a computing device that for selected senders, retrieves entries of the data store of sender specific recipients, master participant data store and data transfer history data store; generates a predicted transfer profile for each recipient for the sender, based on past data transfers and the master participant data store to identify deviations therefrom; and updates the data store of sender specific recipients for the selected sender to update entries for recipients associated with identified deviations.

17 Claims, 10 Drawing Sheets

(56) References Cited

U.S. PATENT DOCUMENTS

| | | |
|---|---|---|
| 8,498,914 B2 | 7/2013 | Hazelhurst |
| 8,600,898 B2 | 12/2013 | Gilder et al. |
| 8,660,950 B2 | 2/2014 | MacKouse |
| 9,311,634 B1 | 4/2016 | Hildebrand |
| 2004/0210520 A1* | 10/2004 | Fitzgerald .............. G06Q 20/04 705/40 |
| 2008/0288397 A1* | 11/2008 | Southard ................ G06Q 10/10 707/999.107 |
| 2013/0262309 A1 | 10/2013 | Gadotti |
| 2013/0311362 A1* | 11/2013 | Milam .................. G06Q 30/04 705/40 |
| 2013/0346302 A1 | 12/2013 | Purves et al. |
| 2014/0310167 A1 | 10/2014 | Meyer et al. |
| 2016/0055583 A1 | 2/2016 | Liberty et al. |
| 2018/0357687 A1* | 12/2018 | Groarke ................. G06Q 20/14 |

\* cited by examiner

| Recipient/Payee | Account Range | Address | FI | Expected Payment Interval | Expected Payment Amount |
|---|---|---|---|---|---|
| | | | | | |

RECIPIENT MANAGEMENT IN COMPUTER NETWORK INITIATED DATA TRANSFERS

TECHNICAL FIELD

This relates to computer network initiated data transfers, and more particularly to managing addresses associated with recipients of such transfers.

BACKGROUND

Modern computing systems and networks are frequently used to initiate data transfers. Errors in directing such transfers still occur. Often, the errors originate with a sender and are caused by initiating a data transfer to an incorrect recipient—for example to a recipient associated with incorrect or outdated addressing particulars.

Not surprisingly, such errors consume network and other resources. Not only do such errors often result in unnecessary network messages and associated data transfer, often the erroneous data transfers need to be reversed requiring additional steps/data transfers to be initiated and completed.

In addition to unnecessarily requiring network resources, erroneous dispatch of data may give rise to unintended consequences. For example, if the data transfer results in the delivery of additional good or services, then these may need to be cancelled or returned. Often unpredictable delays are incurred in identifying the erroneous initiation of data transfers, reversing them, and finally initiating correct transfers.

Accordingly, there is a need for method, devices and systems that allow for the better management of network initiated transfers that allow senders to better manage recipients and their network addresses.

SUMMARY

According to an aspect, there is provided a computerized data transfer system, for allowing data transfers to be initiated over a computer communications network between senders and recipients, by way of sender devices, each including a processor coupled to a memory storing processor executable instructions operable to present an interface allowing an associated individual sender to initiate data transfers over the network by selecting a recipient from a list of recipients, the system comprising: a data store of sender specific recipients, the data store of sender specific recipients including for each of the senders, a profile of recipients for which data transfers can be initiated by that sender and for presentation in the list of recipients for that sender; a data transfer history data store of past data transfers made by each of the senders; a master participant data store that stores profiles of recipients for which data transfers can be initiated over the computer communications network; a computing device including persistent computer readable memory coupled to a processor adapting the computing device to: for a selected sender, retrieve entries of the data store of sender specific recipients, the master participant data store and the data transfer history data store; generate a predicted transfer profile for each recipient in the data store of sender specific recipients for the selected sender, based on past data transfers in the data transfer history data store and the master participant data store, to identify deviations in data transfers to the recipients from the predicted transfer profiles; and update the data store of sender specific recipients for the selected sender to update entries for recipients associated with the deviations, as identified.

According to another aspect, there is provided a method of configuring a computer interface for use by a sender in initiating electronic data transfers over a computer communications network, the method comprising: maintaining a data store of sender specific recipients, the data store of sender specific recipients including identifiers of recipients for which data transfers can be initiated by the sender, for presentation in a user interface to receive a recipient selection; maintaining a master participant data store that stores profiles of recipients for which data transfers can be initiated over the computer communications network; maintaining a data transfer history data store of data transfers made by the sender; generating a predicted transfer profile for each recipient in the data store of sender specific recipients, based on past data transfers in the data transfer history data store and the master participant data store, to identify deviations in data transfers to that recipient from the predicted transfer profile; updating the data store of sender specific recipients to update entries for recipients associated with the deviations, as identified; and extracting entries of the data store of sender specific recipients, as updated and presenting the user interface comprising a list for selection of a recipient, the list reflective of the updating.

According to another aspect, there is provided a computing system for configuring a computer interface for use by a sender in initiating electronic data transfers over a computer communications network, comprising: a data store of sender specific recipients, the data store of sender specific recipients including identifiers of recipients for which data transfers can be initiated by the sender, for presentation in a user interface to receive a recipient selection; a master participant data store that stores profiles of recipients for which data transfers can be initiated over the computer communications network; a data transfer history data store of data transfers made by the sender; at least one processing unit storing executable instructions that cause the processing unit to: generate a predicted transfer profile for each recipient in the data store of sender specific recipient, based on past data transfers in the data transfer history data store and the master participant data store, to identify deviations in data transfers to that recipient from the predicted transfer profile; update the data store of sender specific recipients to update entries for recipients associated with the deviations, as identified; and extract entries of the data store of sender specific recipients, as updated and present the user interface comprising a list for selection of a recipient, the list reflective of the updating.

Other features will become apparent from the drawings in conjunction with the following description.

BRIEF DESCRIPTION OF THE DRAWINGS

In the figures which illustrate example embodiments,

FIG. 7-9 illustrate the organization of data stores of the system of FIG. 1;

DETAILED DESCRIPTION

Figure 1:
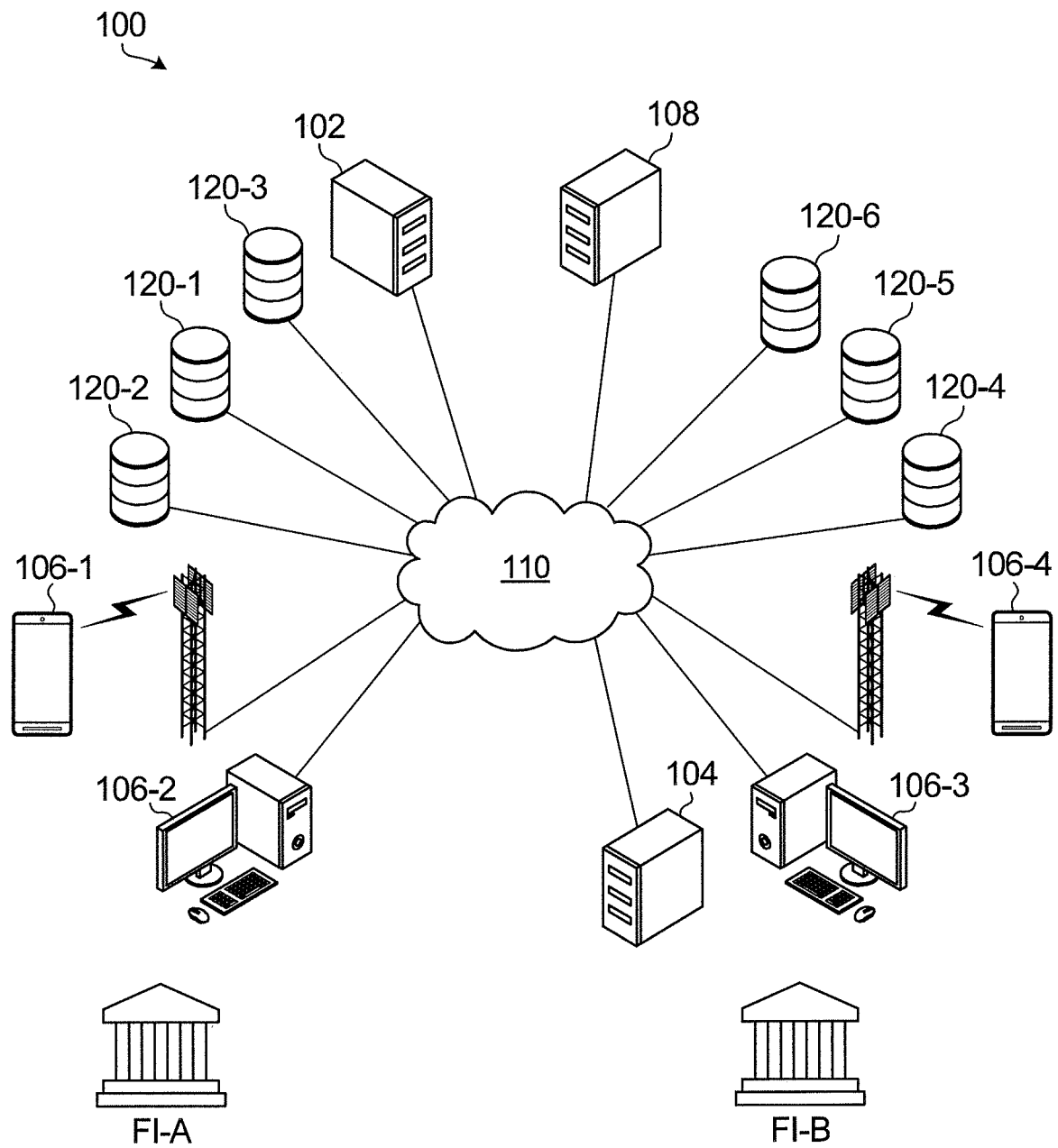
FIG. 1 is a simplified block diagram of an exemplary computerized data transfer system.

FIG. 1 depicts a computing system 100, exemplary of an embodiment. As will become apparent, system 100 allows users at a user device 106-1, 106-2, 106-3, 106-4 to initiate data transfers directed to other recipient users (such as other users at devices 106-1, 106-2, 106-3, 106-4).

As illustrated, system 100 includes transfer initiating servers 102 and 104. Users devices 106-1, 106-2, 106-3, 106-4 (individually and collectively user device(s) 106) are also depicted. Servers 102, 104 and devices 106 are in communication with a computer communications network 110.

End-user computing devices 106 are also depicted. Computing devices 106 may be personal computing devices, such as for example, home (personal) computing devices (e.g. device 106-2, 106-3); mobile devices (e.g. device 106-1, 106-4); or other portable computing devices. Without limitation, devices 106 may be part of a mobile computing device such as a cellular telephone or tablet device or laptop computer, desktop computer, workstation, server, personal digital assistant, interactive television, video display terminal, gaming console, electronic reading device, or any other portable electronic device, or a combination of these.

Computing devices 106 may execute user software—in the form of software allowing customers at devices 106 to initiate data transfers over network 110—in manners exemplified herein. In some embodiments, the data transfers initiate electronic fund transfers between senders (payors) and recipients (payees), and give rise to transfer of funds from payors to payees. Optionally, this software may allow for the receipt of notification of such transfers from other senders.

User software may take the form of software that is stored within persistent memory at each device 106, or may take the form of a suitable software component allowing devices 106 to execute software as a service provided by a server—such as servers 102, 104, or another server associated with a user or his/her service provider.

Data transfer servers 102, 104 in response to receiving a transfer initiating message from a sender at a device 106, by way of network 110 contacts a data transfer server 102 associated with a recipient, by way of optional additional server 108. As noted, the data transfer may be indicative of a financial transaction, in the form of payment of funds transfer, or a request for the delivery of goods or services, or the like. At a recipient server 104, the transaction may be further processed and/or completed. For example, an account of the recipient may be credited. Additionally, optionally, a message may be provided to a user at device 106 of the recipient.

As will be appreciated, in an example embodiment in which funds are transferred between senders and recipients, senders may be recipients and vice versa. Each sender/recipient is a customer of a financial institution (FI).

In the depicted embodiment, servers 102, 104 may allow electronic fund transfer services to customers associated with financial institutions (FIs) A and B, respectively. Example devices 106-1 and 106-2 of FIG. 1 are associated with FI-A (e.g. are device of customers of FI-A). Example devices 106-3 and 106-4 are associated with FI-B (e.g. are devices of customers of FI-B).

FIs may be banks, trust companies, savings and loans, insurance, companies or the like. Only two FIs—FI A, and FI B and associated computing devices are depicted in FIG. 1. However system 100 may easily include computing devices of additional FIs. Likewise, for simplicity only four devices 106 are illustrated. In practical embodiments, thousands of devices 106, or more, may be associated with each FI-A and FI-B.

In the depicted embodiment, server 102 and server 104 act as either sender or recipient servers, and can thus initiate a data transfer (when acting as a sender server), or be the recipient of a data transfer (when acting as a recipient server). As will be appreciated, each FI could separate the functions of a sender server and recipient server across separate servers, or integrate these functions in other computing systems (e.g. a bank's primary accounts computing system, or the like).

System 100 further includes an optional reconciliation server 108 that may mediate data transfers between servers 102, 104. Reconciliation server 108 may, for example, track total transfers between FIs, so that actual net funds that need be exchanged between financial institutions need only be exchanged periodically (e.g. daily, weekly or monthly). Reconciliation server 108 may, for example, form part of an interbank network.

FI-A further hosts, or has access to one or more data stores. Example data stores 120-1, 120-2 and 120-3 associated with FI-A are depicted. Example data stores 120-4, 120-5 and 120-6 associated with FI-B are depicted.

Each of data stores 120-1, 120-2, and 120-3 are repositories for persistently storing and managing data. Data stores 120-1, 120-2 and 120-3 may, for example, be relational data bases, or other data structures—including files, or the like, stored on computer readable media. The computer readable media may be part of network accessible storage (NAS), accessible through network 110. Software—in the form of a database management systems (DBMS) software may further be stored at data stores 120-1, 120-2, 120-3 for execution at those data stores. Alternatively, software used to access data stores 120-1, 120-2 and 120-3 may be stored and executed elsewhere, on other computing devices—for example at server 102.

Address data store 120-1 stores particulars of recipients of transfers for multiple senders—for example associated with device 106-1 and 106-2. Data store 120-1 stores particulars of sender specific recipients including for each of the senders at devices 106 associated with (e.g. that are customers of) FI-A, a profile of recipients for which data transfers can be initiated by that sender and for presentation to that sender. Data store 120-1 is thus maintained by, or on behalf of FI-A. Recipients may be associated with FI-A, the FI of the sender, or with other FIs, for example FI-B, in FIG. 1. The profile for each recipient stored in data store 120-1 may include a network or similar address of recipients allowing data transfer to be initiated over network 110.

Data store 120-2 is a master participant data store that stores profiles of recipients for which data transfers can be initiated over the computer communications network, by customers associated with FI-A.

Data store 120-3 is a further data store that stores particulars of past transfers made by each of the senders at FI-A.

Data store 120-4 is an address data store (like data store 120-1) maintained by FI-B, that stores particulars for multiple senders associated with FI-B. Likewise data store 120-5 is a master participant data store that stores profiles of recipients for which data transfers can be initiated over the computer communications network, by customers associated with FI-B. Data store 120-6 is a further data store that stores particulars of past data transfers made by each of the senders at FI-A.

Communications network 110 may be a packet switched network, and may for example be the public switched internet, or a private network, and may for example support TCP/IP based protocols. Network 110 may include, or be in communication with, a collection of private and public networks, and may include one or more cellular radio network or other wireless networks, for communication with suitable user devices 106, wirelessly. As depicted, device 106-1 and 106-4 may be wireless devices, such as cellular handsets; tablets or the like.

Figure 2:
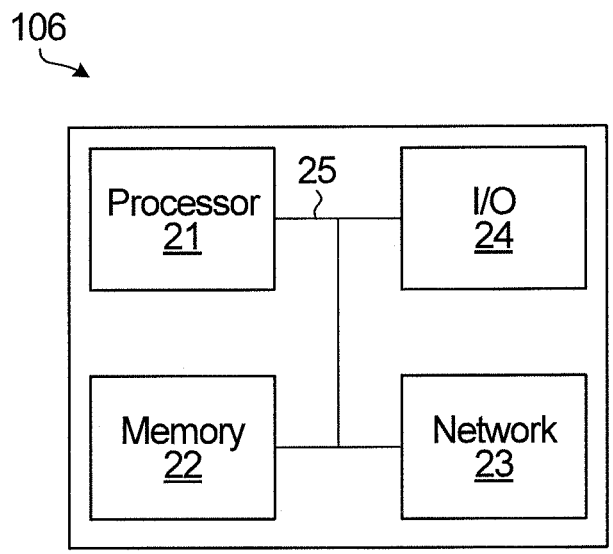
FIG. 2 is a simplified block diagram of a user computing device of the system of FIG. 1.

FIG. 2 is a simplified block diagram of a device 106 of FIG. 1, exemplary of an embodiment.

As illustrated; user device 106 includes one or more processors 21, a memory 22, and one or more input/output (I/O) interfaces 24, and network interface(s) 23; all in communication with each other by way of bus 25. Device 106 may include suitable user input/output components such as a touch screen (in case device 106 is a cellular handset; tablet or the like); or monitor, mouse and keyboard (if device 106 is a desktop computing device).

One or more processor(s) 21 may be one or more Intel x86, Intel x64, AMD x86-64, PowerPC, ARM processors or the like, and may include a single or multiple processing cores.

Memory 22 is computer readable memory and may include random-access memory, read-only memory, or persistent storage such as a hard disk, a solid-state drive or the like. A computer-readable medium may be organized using a file system, controlled and administered by an operating system governing overall operation of the computing device, and may further store multiple software applications.

Software including instructions is executed by processor(s) 21 from a computer-readable medium. For example, software may be loaded into random-access memory from persistent storage of memory 22 or from one or more devices via I/O interfaces 24 for execution by one or more processors 21. As another example, software may be loaded and executed by one or more processors 21 directly from read-only memory.

An I/O interface 24 serves to interconnect the computing device to allow user interaction with device 106. For example, a touch screen may be adapted to allow rendering images on a touch screen display that is also operable to sense touch interaction.

One or more I/O interfaces 24 may serve to interconnect computing device 106 with its peripheral devices, such as for example, keyboards, mice, or the like.

Network interface 23 includes one or more conventional network interfaces suitable for communication with other network enabled devices, and ultimately network 110 (FIG. 1). For example, network interface 23 may include an Ethernet; Bluetooth, WiFi, cellular radio(s), or other similar interfaces adapted to interconnect device 106 to network 110.

Figure 3:
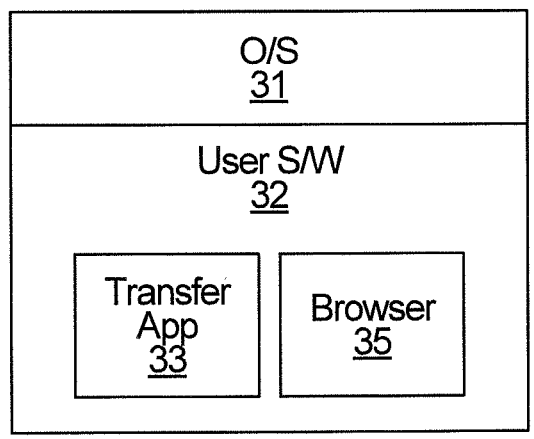
FIG. 3 is a simplified block diagram illustrating the organization of memory at the computing device of FIG. 2.

FIG. 3 depicts a simplified organization of example software components stored within memory 22 of device 106. As illustrated, these software components include operating system (OS) software 31 and user software 32.

OS software 31 may be, for example, Android OS, Apple iOS, Microsoft Windows, UNIX, Linux, Mac OSX, or the like. OS software 31 allows software 32 to access one or more processors 21, memory 22, network interface 23, and one or more I/O interfaces 24 of device 106.

OS software 31 may provide an application programming interface (API) to allow the generation and execution of user applications, such as those described herein. OS software 31 may also include a Java compiler and a Java virtual machine and thus be able to execute java code.

User software 32 may include one or more transfer initiating application(s) 33. Transfer application(s) 33 may for example, be a bill payment, or purchase application. In a particular embodiment, transfer application 33 may be a consumer banking application, allowing a user at device 106 to initiate a variety of financial transactions.

Alternatively or additionally user software 32, may include a web browser 35, or similar html, xml or other structured language interpreter. The web browser 35 or similar application may further include a Javascript interpreter. As will be appreciated, web browser 35 may present a user interface to a further application or applet forming part of user software 32. Alternatively, web browser 35 may present an application to a server-side application, executing for example, at server 102.

Suitable code may be pre-loaded into memory 22 at device 106, or may be loaded from a network interconnected server (e.g. server 102, or an application repository) on demand—when required, or a combination thereof.

Example transfer application(s) 33 may initiate electronic funds transfer (EFT) between senders (acting a payors) and recipients (acting as payees), at the same or at different FIs.

As noted, devices 106-1 and 106-2 may for example be personal computing devices of customers at FI-A. Devices 106-3 and 106-4 may be personal computing devices of customers at FI-B. Customers may, for example, be retail banking customers or commercial banking customers.

Figure 4:
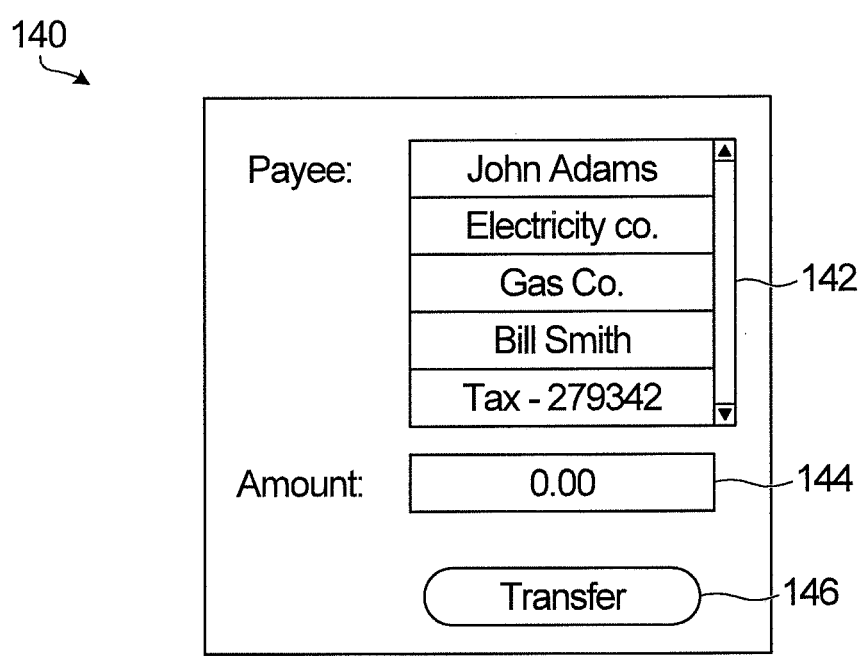
FIG. 4 illustrates a user interface at the device of FIG. 2.

An example screen of a user interface (UI) 140 provided by application 33 that is presented to a user at device 106 to allow such data transfers to be initiated is depicted in FIG. 4.

As illustrated, UI 140 includes a selection field 142 that allows user selection of a transfer recipient to which a transfer is to be initiated. Selection field 142 may be a drop-down box, and may present a list of choices, each representing a possible recipient. UI 140 further includes an amount entry field 144 that specifies an amount of the transfer to be initiated. UI 140 further includes a button 146 that allows the initiation of a transfer to a recipient chosen in selection field 142, for an amount specified in entry field 144.

UI 140 may include further screens (not illustrated) allowing a user to otherwise interact with an associated FI of the user. For example, UI 140 may present a screen allowing a user to view and modify his/her personal information (name, address, etc.); a further screen to allow the user to view recent transactions (e.g. payors/payees; amounts; and dates); and further screens to order related products or services.

Figure 5:
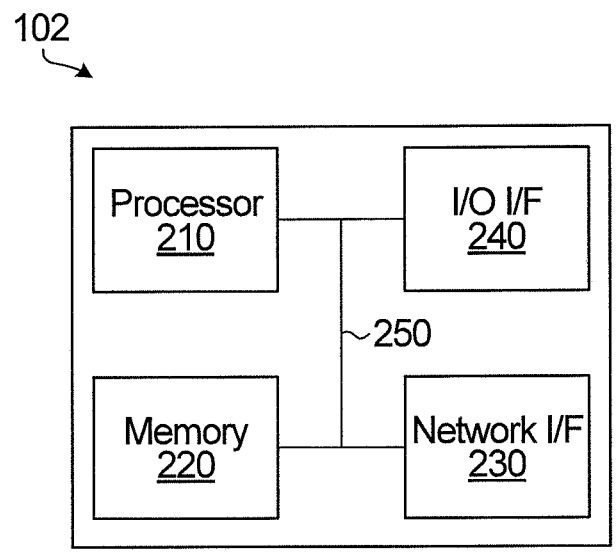
FIG. 5 is a simplified block diagram of a server computing device of the system of FIG. 1.

FIG. 5 is a high-level block diagram of server 102, exemplary of embodiments. Server 104 (FIG. 1) may be identical in structure. Server 108 may have the same structure.

As illustrated, server 102, is a computing device, includes one or more processors 210, a memory 220, a network interface 230 and one or more I/O interfaces 240 in communication with each other over bus 250.

Processors 210 may be one or more Intel x86, Intel x64, AMD x86-64, PowerPC, ARM processors or the like, having one or multiple computing cores.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network interface 230 serves as a communication device to interconnect the computing device with one or more computer networks such as, for example, a local area network (LAN) or a wide area network (WAN), like the Internet. Network interface 230 may, for example, be an Ethernet or similar interface.

One or more I/O interfaces 240 may serve to interconnect server 102 with peripheral devices, such as for example, keyboards, mice, and the like. Optionally, network controller 230 may be accessed via the one or more I/O interfaces.

Figure 6:
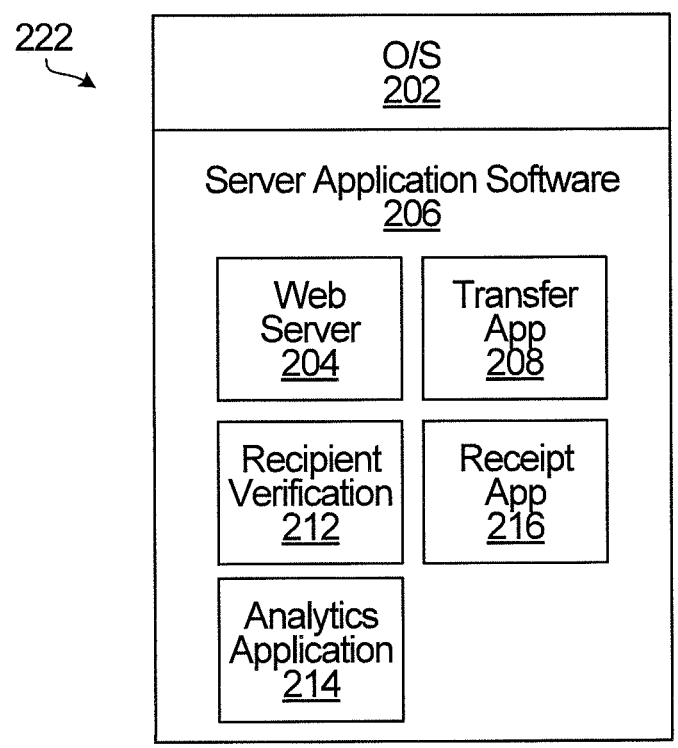
FIG. 6 is a simplified block diagram illustrating the organization of memory at the server computing device of FIG. 5.

FIG. 6 illustrates the organization of software 222 at stored in memory 220 of server 102.

Software 222 including instructions to be executed by one or more processors 210 from a computer-readable medium. For example, software 222 may be loaded into random-access memory from persistent storage of memory 220 or from one or more devices via I/O interfaces 240 for execution by one or more processors 210. As another example, software may be loaded and executed by one or more processors 210 directly from read-only memory.

Software 222 may include an operating system 202, and server side application software 206. Operating system 202 may be Windows Server; macOS Server; Linux based, or other server software. Server software 206 may include a web server software 204 capable of serving http, or similar code for presentation of html pages, by a complementary browser/application 35/33 at device 106. Additionally, server software 206 may allow for execution of server side applications.

Software 222 (and in particular application software 206) allows data transfers to be performed over computer communications network between senders and recipients, by way of sender devices 106. Specifically, software 206 includes a transfer initiating component 208. Likewise server 102 may store software to receive an indication of a data transfer from another server (e.g. server 104/102, or server 108)—depicted as a transfer receipt component 216.

To that end, transfer initiating component 208 provides data to user devices 106 to allow senders at these devices to select suitable recipients of data transfers. In particular, transfer initiating component 208 may provide users at device 106 with sufficient data to present list selection block 142 in UI 140 (FIG. 5), thus allowing an associated individual user, acting as sender, to initiate data transfers to sender specific recipients, over network 110 by selecting a recipient from the list of possible recipients. List selection block 142 may be populated from data identifying sender specific recipients, stored in data store 120-1.

Example data stores 120-1, 120-2 and 120-3 are maintained, for example, by FI-A to better manage particulars of recipients of data transfers. Data stores 120-1, 120-2 and 120-3 are further illustrated in FIGS. 7-9. Data stores 120-4, 120-5 and 120-6 may be identical data stores to data stores 120-1, 120-2 and 120-3, but maintained by FI-B. These are not separately detailed. Data stores 120-1, 120-2 and 120-3 may be accessible by server software 206.

Figure 7:
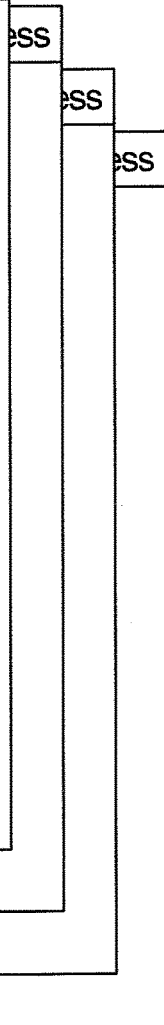

As illustrated in FIG. 7, data store 120-1 is an address data store of sender specific recipients. Sender specific recipients may be those recipients (e.g. payees) identified by a particular customer (e.g. sender) of an FI (e.g. FI-A) as a possible recipient of funds through a sender initiated transaction by a specific sender. Sender specific recipients may for example be input by individual users at device 106. Again data store 120-1 may be a list of entries stored in a database or the like. For customers of FI-A, such data store 120-1 may be stored at server 102, or another network accessible storage device of FI-A, or possibly even at multiple device 106.

As illustrated, data store 120-1 in FIG. 7, may include, for each sender of FI-A, a list (possible organized as records in one or more data base tables) identifying possible recipients of transfers by that sender. For each recipient (payee), the physical address of the payee may be maintained, as well as an account number, and a network address. The network address may be an electronic funds transfer address, or other address sufficient to route data and/or funds to a recipient. In an embodiment, the address may be the SWIFT code of the recipient FI that may optionally be combined with a unique account number of a recipient. In other embodiments the address may be an email address of the recipient.

Figure 9:
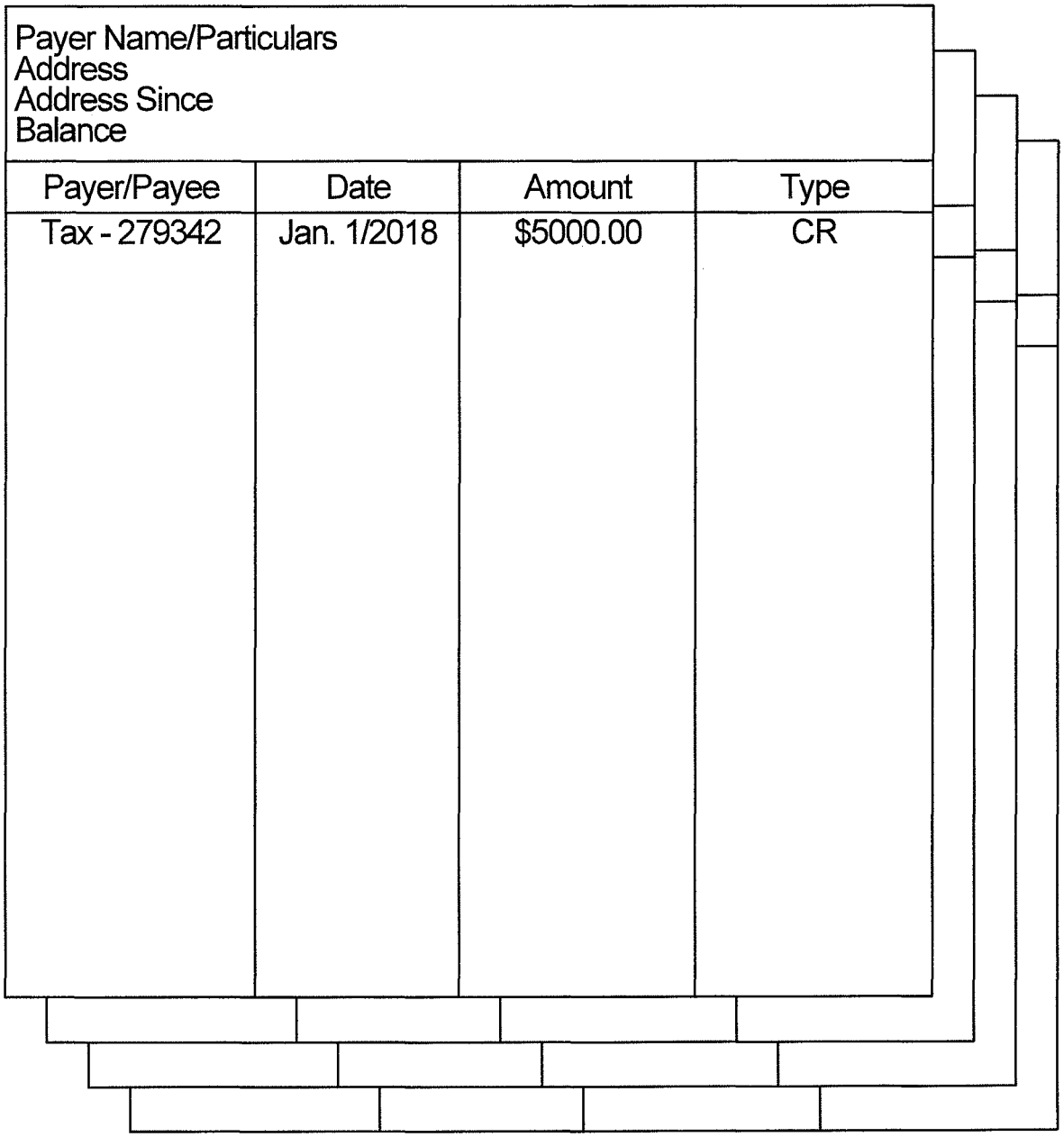

FI-A further maintains data store 120-3 depicted in FIG. 9. Data store 120-3 includes information about past transactions made by customers of FI-A. For example, data store 120-3 may include a table or similar structure, storing records or entries reflecting all transfers made by an associated customer of FI-A. In the example embodiment, each record may identify debits and/or credits made to one or more bank accounts of customers at FI-A, or a subset of such debits and/or credits. Data store 120-3 may take the form of a relational or other database including one or more tables for storing entries in a related way. Entries of data store 120-3 may take the form of records of this database, organized in tables, with each table holding transaction records for a single customer, or a single account for a single customer of FI-A. Each record may include a payee name/address, and amount, and transfer type (e.g. deposit; electronic transfer; or the like). A further entry of data store 120-3 may contain particulars of the payor—including a payer name; address; address change date; account balance; etc. For illustration purposes this data is depicted in the same table as transaction records in FIG. 9. However, the personal data may be stored in a separate linked table. Other structures for data stores 120-3 will be apparent to those of ordinary skill.

As transactions are made by customers of FI-A, entries are added to data store 120-3, reflecting each transaction. Optionally, all financial transactions made by the customers (including financial transactions not initiated by system 100) may be added to data store 120-3. Data store 120-3 may thus be used to produce a historic record of all transactions made by each customer of FI-A, and possibly to reconcile the accounts of customers of FI-A. Possibly data store 120-3 may thus include or mirror the bank account records of each customer of FI-A.

Organized as a database, data store 120-3 may easily be queried to locate transactions of a particular customer (sender) to, for example, extract transaction records of payments to a particular recipient.

Figure 10:
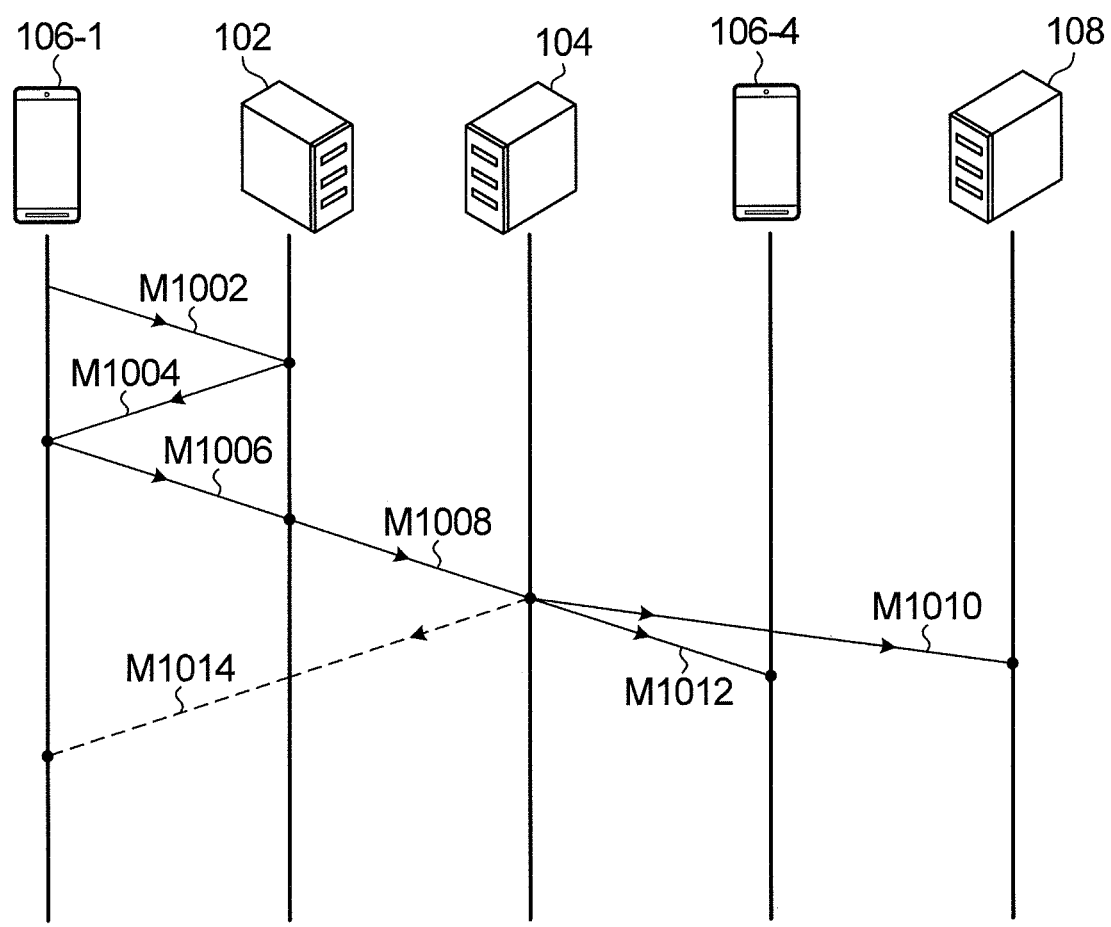
FIG. 10 illustrates message flows in initiating a data transfer using the system of FIG. 1.

Data transfers may be initiated as depicted in FIG. 10, between senders and recipients. Specifically, a sender at a device 106 (e.g. 106-1) may execute application 33 at that device 106. Application 33 at device 106-1 contacts server software 208 by generating a message M1002 and generates UI 140 for the user. Based on the identity of the sender, server software 208 may extract entries of data store 120-1 to generate the list presented in selection block 142 by transfer application 33, and provide that list to device 106-1 by way of message M1004. A customer (acting a sender) may select a payee from the list provided from data store 120-1 at UI 140. The sender further inputs additional payment details at device 106-1—including a payment amount, and optionally a payment interval, and an identifier that the payment is to be recurring at an interval, through UI 140 at a device 106 (additional input fields are not specifically illustrated).

Once information is complete, the sender may interact with transfer button 146 of UI 140. In response, a data transfer is initiated, that ultimately results in a funds transfer to the identified recipient. In particular, application 33 forms one or more data packets in message M1006 identifying the funds transfer—the message M1006 may include the identity of a transfer recipient, an amount, and an address of the recipient. In an example embodiment, the address of the recipient may include electronic funds transfer information, including account and financial institution data. The message M1006 may be cryptographically signed or encrypted, and transferred to server 102 associated with the sender. Transfer application 208 at the sender's server 102 may thereafter generate a further message M1008 that is dispatched to the recipient's financial institution, for example to server 104.

Application 216 at server 104 at the recipient's financial institution may receive the message M1008 for the recipient, and in turn may credit an identified recipient's bank account, with the amount specified in the message. A message M1012 may notify the recipient (e.g. at device 106-4) of the transfer.

Additionally, message M1010 identifying the transfer may be provided to reconciliation server 108, either by receipt application 216 of the recipient's financial institution (e.g. at server 104), or by transfer application 208 at server 102 (not shown). Again, the message may be cryptographically signed or encrypted.

Data store 120-3 and 120-6 may be updated by FI-A and FI-B, respectively, to reflect the funds transfer. Specifically, a record identifying a credit to the account of the recipient may be added to data store 120-6, and a corresponding record identifying a debit to an account of the sender may be added to data store 120-3. Actual funds may be transferred between FI-A and FI-B in an interbank transfer, based on records at reconciliation server 108.

To enhance accuracy of data transfers using system 100, a master participant data store 120-2 that stores profiles of recipients for which data transfers can be initiated over network 110 using system 100 is also maintained. This data-store 120-2 is further depicted in FIG. 8. In the depicted embodiment, master participant data store 120-2 stores profiles of recipients known to FI-A. Data store 120-4 (FIG. 1) may be a master participant data store for FI-B and may similarly store profiles of recipients known to FI-B.

Master participant data store 120-2 may include an identity and further information for each possible recipient/payee, in a recipient profile. Data store 120-2 may store profiles of possible recipient known to FI-A across its customer base (e.g. for all users at devices 106). Data store 120-2 may again take the form of a database or other structure suitable for storing data entries. Each profile in data store 120-2 may include particulars of a known recipient, including for example an address on system 100 for initiating a financial transaction (e.g. money transfer), as well as other particulars. Typically the profiles of example recipients will include a specific account, and bank, and payee payment details such as a payment amount range; a payment interval; and other information. A physical recipient address may further be included. An example profile may further include an indicator that a recipient typically receives payments between two set amounts at the account (e.g. between $20 and $200); that payments are (or are not) received at recurring intervals from senders; the duration of the recurring interval; etc.

Optionally, data store 120-2 may include further recipient profile information, specific to each particular sender. Data store 120-2 may, for example, include a further table for each recipient identifying this recipient profile information specific to individual senders at FI-A. For example, the last date a particular sender initiated a transfer to a specific recipient; an account expiry date of a sender account with the recipient; expected payment amounts or intervals for a particular sender at FI-A, may also be stored in data store 120-2 (not specifically illustrated in FIG. 8).

Master participant data store 120-2 may be pre-populated by FI-A or may be populated as users add recipients/payees to their personal payee list, as stored in data store 120-1.

Figure 11:
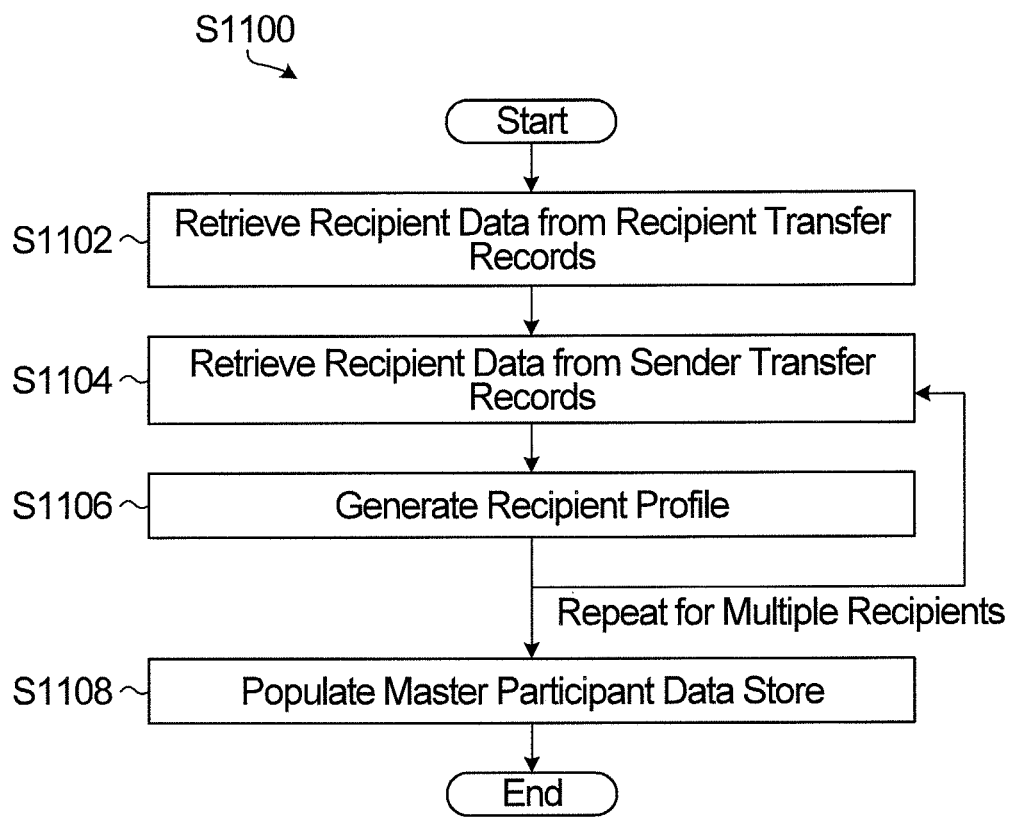
FIG. 11 is a flowchart used in the population of data store of FIG. 8.

In an embodiment, an analytics component 214 may mine (i.e. read and access) account information of recipients/payees of FI-A and analyse this information to form master participant list in data store 120-2 in blocks S1100 as exemplified in FIG. 11. Analytics component 214 is illustrated to be stored and executed at server 102. However, the skilled person will readily appreciate that this component may be hosted and executed at any computing device operated by FI-A.

Specifically, for example, some recipients/payees may explicitly provide payment and account institution to FI-A relevant to data store 120-2, and this information may be stored by FI-A in a data store (not specifically illustrated) associated with the recipients. In block S1102 analytics component 214 may retrieve this stored information and populate data store 120-2. Additionally, analytics component 214 may gather payee/recipient information from other sources.

For example, in block S1104 analytics component 214 may retrieve recipient data stored in data store 120-3 and analyse the retrieved data to identified recipients—including recipient account numbers; transfer intervals by senders; and payment amount ranges, to generate recipient profiles in block S1106. The generated recipient profiles may be used by analytics component 214 to populate master participant data store 120-2.

To the extent that payees/recipients are not customers of FI-A, analytics component 214 may not have access to recipient transaction records stored in data store 120-3. Instead, analytics component 214 may have access to transfer records of multiple senders who may have paid the same payee, stored in data store 120-3. These transaction records may retrieved in block S1104, and in the aggregate, may be used by analytics component 214 in block S1106 to compile transfer information to the same recipient by multiple senders from sender data stored in data store 120-3, to generate profile for a particular recipient to be stored in data store 120-2 in block S1108. Optionally, blocks S1100 may be repeated periodically (e.g. every few weeks or months) to update master participant data store 120-2.

Optionally, blocks S1100 may be performed to add newly identified recipients added by a user to data store 120-1 that are not yet found in data store 120-2. Blocks S1100 may thus be performed each time a newly identified recipient is added, or after a number of newly identified recipients have been added by users at device 106. Newly identified recipients may be maintained in a list (not shown) used by block S1100 to so add new recipients to data store 120-2.

As will be appreciated, circumstances change and entries within data store 120-1 may become inaccurate, or no longer relevant to a particular sender. For example, a sender (as payor) may close a recipient account; recipient particulars may change (e.g. in case of a replacement credit card, or a replacement account).

Unfortunately, choosing an inaccurate or irrelevant recipient address may still initiate a financial transaction to an identified recipient/payee identified in the entry of data store 120-1 that is no longer accurate or relevant. This, in turn, may result in the transfer of incorrect data and unnecessary data on network 110, and the initiation of unnecessary transactions, that may ultimately need to be reversed.

Figure 12:
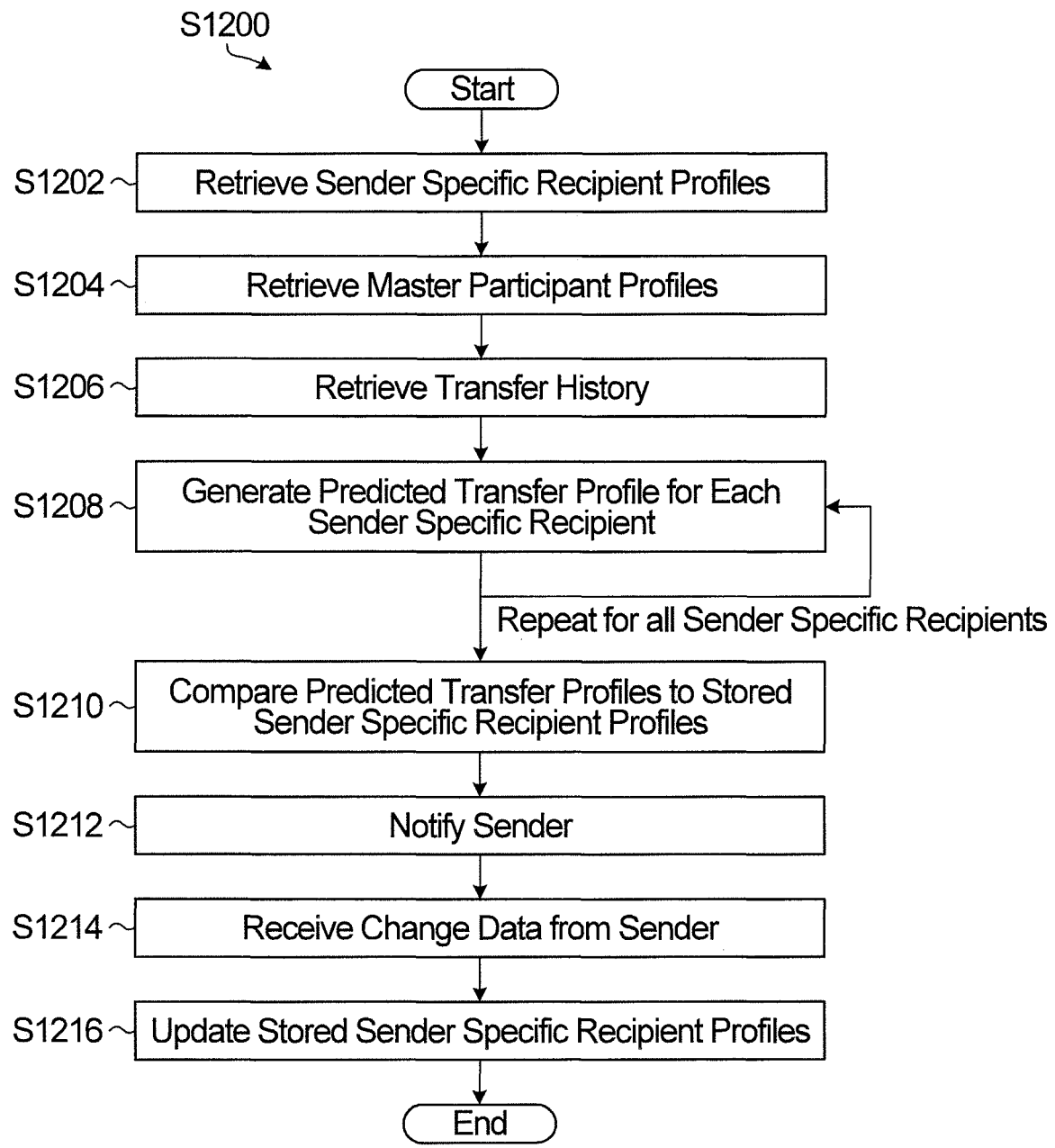
FIG. 12 is a flowchart used in maintaining the data store of FIG. 7.

Accordingly, as illustrated in FIG. 12 further recipient verification software 212 stored at server 102 may be used to update data store 120-1 to ensure that recipients for payees 106 associated with FI-A are likely accurate/relevant. This, in turn, helps better configure UI 140 (FIG. 4) to ensure that the contents of selection block 142 are more accurate.

To that end, recipient verification software 212 performs blocks S1200 of FIG. 12 to update the data store 120-1 of sender specific recipients. Blocks S1200 may be performed periodically (e.g. daily, weekly, monthly, annually, etc.), or upon demand—for example any time, (or after a pre-determined number of times) that a user executes application 33 at a device 106 to initiate a transfer.

As illustrated, for a selected sender, server 102 under control of verification software 212 retrieves entries of data store 120-1 of sender specific recipients for that sender in block S1202. In block S1204, entries of the sender specific recipients may be retrieved from master participant data store 120--2. As well, the data transfer history for that sender (or a portion thereof) may be retrieved from data store 120-3 in block S1206.

In block S1208, server 102 under control of verification software 212 may generate a predicted transfer profile for each recipient in the data store of sender specific recipients for the selected sender 120-1, based on past data transfers in the data transfer history data store 120-3 and the master participant data store 120-2. Block S1208 may be repeated for each recipient in sender specific data store 120-1, or may only be performed for a sender selected at UI 140 for which a data transfer is being initiated by way of message M1006.

In block S1210, verification software 212 identifies deviations in data transfers to recipients from the predicted transfer profiles. Optionally, any pending transfer (as for example initiated by message M1006) may also be used in identifying deviations in data transfers.

Deviations may for example be identified by comparing the interval of data transfers to a recipient by the sender to the expected payment interval for the recipient. Deviations may also be identified if an amount to be transferred does not fit within the range specified in data store 120-2. A deviation may also be identified if a transfer to a recipient has not been effected in some pre-defined time window (e.g. 6 months; 1 year; 2 years; etc.). Such a deviation may also be identified if the recipient profile identifies a zero balance for an otherwise active recipient account (e.g. a credit card account). Such a recipient may be identified as a dormant payee/recipient. A deviation may also be identified if the address of a sender has changed, and the profile of the recipient specifies the sender address as relevant. Likewise, a deviation may be identified if the recipient profile identifies an account expiry date (as for example for a credit card account) and that date is approaching or has passed.

If a deviation is identified in block S1210, a notification notifying the sender of the deviation over the computer communications network 110 may be dispatched in block S1212. For example, the deviation may be presented in UI 140 (FIG. 5) as a message to the sender. Alternatively, an email, SMS or other electronic message may be dispatched to device 106 of the sender.

For example, a message identifying the deviation may be presented. In the case of a dormant recipient, for example, a message identifying the last transaction or its date may be presented, and a query whether the recipient remains relevant may be presented.

The message may alternatively, for example, solicit sender input identifying sender specific recipients to update data store 120-1 of sender specific recipients. Sender input may, for example be provided by way of application 33 or browser 35 and received at server 102 in block S1214.

In response to sender input, sender specific recipients entries associated with recipients giving rise to the deviations in data store 120-1 may be deleted or updated in block S1216.

Conveniently, updating data store 120-1 may maintain the accuracy of the recipient list presented in UI 140, and thus reduce errors in the initiation of data transfers to incorrect recipients over network 110.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A computerized data transfer system, for allowing data transfers to be initiated over a computer communications network between a plurality of senders and a plurality of recipients, the system comprising:

a data store including a list of recipients for each sender of a plurality of senders and for each recipient of the list of recipients a profile comprising recipient information including a network address;

a sender device associated with a sender;

a data transfer history data store of data transfers made by the sender;

a master participant data store that stores master recipient profiles of recipients of the list of recipients for which data transfers can be initiated;

a first device coupled with the data store, the sender device, the data transfer history data store, and the master participant data store, and comprising:

one or more processors; and a memory storing instructions that, when executed by the one or more processors, cause the one or more processors to perform, for each recipient in the list of recipients, the steps of:

retrieving recipient information from the data transfer history data store and the master recipient profiles from the master participant data store;

generating a predicted transfer profile based on the retrieved recipient information and master recipient profiles;

identifying a deviation in data transfers from the sender;

responsive to identifying the deviation, updating the data store by deleting the recipient profile from the list of recipients that is associated with the deviation; and displaying a list of recipients in a selection field of a user interface of the sender device, the user interface of the sender device configured to receive the list of recipients, the list of recipients excluding the deleted recipient profile, wherein the sender device comprises one or more sender device processors and a sender device memory storing sender device instructions that, when executed by the one or more sender device processors, cause the one or more sender device processors to perform the steps of:

receiving, from the sender via the user interface, an amount and a selection of a recipient from the displayed list of recipients; and transferring the amount to the selected recipient using the network address of the selected recipient.

2. The system of claim 1, wherein the instructions, when executed by the one or more processors of the first device, further cause the one or more processors to perform the steps of: updating the master participant data store based on data transfers from several senders among the plurality of senders.

3. The system of claim 1, wherein the predicted transfer profile includes an expected data transfer interval for a recipient, and wherein the instructions, when executed by the one or more processors of the first device, further cause the one or more processors to perform the steps of: identifying the deviations by comparing, for the sender:

an interval of data transfers from the sender to the recipient, in the profile of the recipient; and an expected data transfer interval in the predicted transfer profile.

4. A computerized data transfer method, for allowing data transfers to be initiated over a computer communications network between a plurality of senders and a plurality of recipients, the method comprising:

storing, by a data store, a list of recipients for each sender of a plurality of senders and for each recipient of the list of recipients a profile comprising recipient information including a network address;

storing, by a data transfer history data store, data transfers made by a sender;

storing, by a master participant data store, master recipient profiles of recipients of the list of recipients for which data transfers can be initiated;

retrieving, by the one or more processors of the first device, recipient information from the data transfer history data store and the master recipient profiles from the master participant data store;

generating, by the one or more processors of the first device, a predicted transfer profile based on the retrieved recipient information and master recipient profiles;

identifying, by the one or more processors of the first device, a deviation in data transfers from the sender;

responsive to identifying the deviation, updating, by the one or more processors of the first device, the data store by deleting the recipient profile from the list of recipients that is associated with the deviation;

displaying, by the one or more processors of the first device, a list of recipients in a selection field of a user interface of a sender device associated with the sender, the user interface of the sender device configured to receive the list of recipients, the list of recipients excluding the deleted recipient profile;

receiving, by one or more processors of the sender device, from the sender via the user interface, an amount and a selection of a recipient from the displayed list of recipients; and transferring, by the one or more processors of the sender device, the amount to the selected recipient using the network address of the selected recipient.

5. The method of claim 4, wherein a master recipient profile for a recipient includes an expected data transfer interval for the recipient, and wherein the predicted transfer profile for the recipient comprises the expected data transfer interval for the recipient.

6. The method of claim 5, further comprising: updating, by the one or more processors of the first device, the expected data transfer interval for the recipient based on a data transfer to the recipient.

7. The method of claim 4, further comprising:

receiving, by the one or more processors of the first device, sender input including a profile of a recipient to update; and updating, by the one or more processors of the first device, based on the receiving of the sender input, the data store.

8. The method of claim 4, further comprising: storing, by the master participant data store, in a master recipient profile, payment parameters of data transfers.

9. The method of claim 4, further comprising: by the one or more processors of the first device, subsequent to identifying the deviation, notifying the sender of the deviation over the computer communications network.

10. The method of claim 4, wherein the identifying the deviation comprises identifying a dormant account of the sender in the data store.

11. The computerized data transfer system of claim 1, wherein the deviation is identified based on one or more pending data transfers to a recipient.

12. The computerized data transfer system of claim 1, wherein the deviation is identified based on comparing a transfer characteristic associated with data transfers from the sender to a recipient with a parameter in the master recipient profile of the recipient.

13. The computerized data transfer system of claim 12, wherein the parameter is a range.

14. The computerized data transfer system of claim 13, wherein the characteristic is a transfer interval.

15. The computerized data transfer system of claim 13, wherein the characteristic is a quantity.

16. The computerized data transfer system of claim 1, the instructions, when executed by the one or more processors of the first device, further cause the one or more processors to perform the steps of:

in response to the identifying the deviation, notifying the sender of the deviation over the computer communications network.

17. The computerized data transfer system of claim 16, the instructions, when executed by the one or more processors of the first device, further cause the one or more processors to perform the steps of:

receive a response to the notifying and wherein the updating is performed in response to receiving the response and in accordance with an instruction included in the response.

* * * * *